United States Patent
Toyoda et al.

(10) Patent No.: US 10,488,038 B2
(45) Date of Patent: Nov. 26, 2019

(54) METHOD FOR PRODUCING A HEAT TRANSFER TUBE FOR STEAM GENERATOR USING DRAWING, SOLUTION HEAT TREATMENT, AND STRAIGHTENING

(71) Applicant: NIPPON STEEL & SUMITOMO METAL CORPORATION, Tokyo (JP)

(72) Inventors: Masatoshi Toyoda, Tokyo (JP); Kouichi Kuroda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 16/016,755

(22) Filed: Jun. 25, 2018

(65) Prior Publication Data
US 2018/0299121 A1    Oct. 18, 2018

Related U.S. Application Data

(62) Division of application No. 13/806,520, filed as application No. PCT/JP2011/003194 on Jun. 7, 2011, now abandoned.

(30) Foreign Application Priority Data

Jun. 28, 2010   (JP) .................. 2010-146136

(51) Int. Cl.
  *F22B 37/12*   (2006.01)
  *B21C 9/00*    (2006.01)
  (Continued)

(52) U.S. Cl.
  CPC ............. *F22B 37/12* (2013.01); *B21C 9/00* (2013.01); *B21C 19/00* (2013.01); *B21D 3/02* (2013.01);
  (Continued)

(58) Field of Classification Search
  CPC . B21D 3/02; B21D 3/04; B21D 51/24; B21D 22/201; C21D 6/004; C22C 19/05;
  (Continued)

(56) References Cited

U.S. PATENT DOCUMENTS 5,253,678 A * 10/1993 Furugen .............. B21C 1/24
                                              138/177
5,294,309 A   3/1994 Seimiya
(Continued)

FOREIGN PATENT DOCUMENTS

DE   197 24 300   12/1998
EP   0 390 482    10/1990
(Continued)

Primary Examiner — Steven B McAllister
Assistant Examiner — Benjamin W Johnson
(74) Attorney, Agent, or Firm — Clark & Brody

(57) ABSTRACT

A method for producing a heat transfer tube for a steam generator comprises a step of providing a tube and then applying cold drawing to the tube by using a high-pressure lubricating oil of 40 MPa or more in pressure. After the step of applying cold drawing to the tube, a step of applying a solid solution heat treatment to the tube is conducted. After the step of applying a solid solution heat treatment to the tube, a step of straightening the tube by using a roll straightening machine is conducted. An offset amount of 5 mm or less is formed for at least successive three pairs of upper and lower straightening rolls of the roll straightening machine.

2 Claims, 2 Drawing Sheets

(51) Int. Cl.

| | | |
|---|---|---|
| *B21C 19/00* | (2006.01) | |
| *B21D 3/04* | (2006.01) | |
| *C21D 6/00* | (2006.01) | |
| *C22F 1/10* | (2006.01) | |
| *C22C 19/05* | (2006.01) | |
| *C22C 38/40* | (2006.01) | |
| *B21D 3/02* | (2006.01) | |
| *B21D 22/20* | (2006.01) | |
| *B21D 51/24* | (2006.01) | |
| *F28D 21/00* | (2006.01) | |
| *F28F 1/40* | (2006.01) | |

(52) U.S. Cl.
CPC ............. *B21D 3/04* (2013.01); *B21D 22/201* (2013.01); *B21D 51/24* (2013.01); *C21D 6/004* (2013.01); *C22C 19/05* (2013.01); *C22C 38/40* (2013.01); *C22F 1/10* (2013.01); *F28D 2021/0064* (2013.01); *F28F 1/40* (2013.01)

(58) Field of Classification Search
CPC . C22C 38/40; C22F 1/10; F22B 37/12; F28D 2021/0064; F28F 1/40; B21C 19/00; B21C 9/00
USPC .......................................... 122/235.14; 72/283
See application file for complete search history.

(56) References Cited

U.S. PATENT DOCUMENTS

| | | | |
|---|---|---|---|
| 6,029,714 A | 2/2000 | Imamura et al. | |
| 2004/0055674 A1 | 3/2004 | Yazawa et al. | |
| 2005/0191509 A1* | 9/2005 | Nakashima | B21D 3/04 |
| | | | 428/610 |
| 2009/0064752 A1* | 3/2009 | Tsuyuguchi | B21D 3/04 |
| | | | 72/369 |

FOREIGN PATENT DOCUMENTS

| | | | |
|---|---|---|---|
| EP | 0 431 775 | | 6/1991 |
| EP | 2 018 911 | | 1/2009 |
| JP | 49-89663 | | 8/1974 |
| JP | 55-103222 | | 8/1980 |
| JP | 61-044349 | | 3/1986 |
| JP | 61-180603 | | 8/1986 |
| JP | 2-130462 | | 5/1990 |
| JP | 3-018419 | | 1/1991 |
| JP | 2000-317521 | | 11/2000 |
| JP | 2004-330297 | | 11/2004 |
| JP | 2005-144479 | | 6/2005 |
| JP | 2006-272396 | | 10/2006 |
| JP | 54-01964 | | 6/2010 |
| JP | 2010-138473 | | 6/2010 |
| JP | 5401964 | * | 6/2010 |
| JP | 2006-064211 | | 3/2012 |
| WO | 95/28239 | | 10/1995 |
| WO | 2007/119817 | | 10/2007 |

* cited by examiner

METHOD FOR PRODUCING A HEAT TRANSFER TUBE FOR STEAM GENERATOR USING DRAWING, SOLUTION HEAT TREATMENT, AND STRAIGHTENING

This application is a Divisional of U.S. Ser. No. 13/806,520 filed on Dec. 21, 2012, which is a national phase of PCT/JP2011/003194 filed on Jun. 7, 2011.

TECHNICAL FIELD

The present invention relates to a heat transfer tube used for a steam generator of nuclear power generation and thermal power generation plants and to a method for producing the same. In more detail, the present invention relates to a heat transfer tube for a steam generator, which can improve an inspection efficiency in the inspection by an inner probe type eddy current test, and to a method for producing the same.

Here, unless otherwise described, the definition of a term in the preset description is as follows.

"Heat transfer tube for steam generator": this term defines a heat transfer tube having a small diameter and a longer-length used for a steam generator or the like in nuclear power generation and thermal power generation plants. In particular, a heat transfer tube for a steam generator for the nuclear power generation is also abbreviated as an SG (steam generator) tube.

BACKGROUND ART

An SG tube in an U-like form and used for a steam generator and a heat exchanger such as a feed water heater, which are used in a nuclear power plant, is produced by bending a heat transfer tube having a small diameter and a longer length into the shape of a letter U. In this SG tube in an U-like form, an inspection for detecting a flaw from the inner surface of the tube by an inner probe type eddy current test is performed as a pre-service inspection after the tube is incorporated into the heat exchanger and as an in-service after servicing for a predetermined period. An inspection standard for the inner probe type eddy current flaw detection of the tube is extremely strict because the safety of the nuclear power generation plant needs to be secured.

FIG. 1 is an example of a chart showing the result of the eddy current flaw detection of an inner surface of a tube. As shown in the drawing, in the chart are shown a signal S from a standard notch specified by Inspection Standard and a signal N having a constant cycle P. The signal N is referred to as base noises and is caused by a minute dimensional variation generated along an axial direction of the tube. The magnitude of the signal N needs to be made as small as possible so as to prevent the signal N from being falsely determined as a signal due to a detected flaw and to perform a quick flaw interrogation to thereby improve inspection efficiency. In the following description, a ratio of the signal S caused by a standard notch to the signal N is referred to as "an S/N ratio."

For example, in the case where when the inner probe type eddy current test is performed for the inspection of the inner surface of tube, an automatic flaw interrogation is made on the basis of signals shown on the chart, when base noises are high, that is, the S/N ratio is small, a signal exhibiting a small but deleterious defect is hidden under base noises, which makes it difficult to distinguish the small deleterious defect from the base noises.

For this reason, when the eddy current flaw detection is performed, an examiner visually observes the result of the eddy current flaw detection and when the examiner finds a doubtful signal that might be generated at a specific portion, the examiner again inspects the specific portion at a lower speed to thereby distinguish the small deleterious defect from the base noises, which decreases inspection efficiency. Since the base noises are caused by a minute dimensional variation generated along a longitudinal direction of an SG tube, the reduction in the dimensional variation along a longitudinal direction of the SG tube is important so as to improve the inspection efficiency in the eddy current flaw detection.

In general, the SG tube like this is produced by a production process including the following steps of:

(1) finishing a tube into a predetermined size in a cold working process;

(2) removing the residual stress of the tube and homogenizing the microstructure of the tube in a solid solution heat treatment process; and (3) straightening bends and out-of-roundness of the tube that are generated by the residual stress attributable to the solid solution heat treatment process, by use of a roll straightening machine in a straightening process.

In the cold working process, a cold rolling method (Pilger rolling) by a Pilger mill using rolls and a mandrel or a drawing work using tools such as a die and a plug is employed. In this drawing work, in order to reduce friction caused when the tool is brought into contact with a tube as workpiece to thereby prevent seizing and vibration/chattering from being caused, in general, a chemical treatment lubricating coating is formed on the inner surface and the outer surface of the tube to be drawn to thereby apply a lubricating treatment to the inner surface and the outer surface of the tube.

However, since the SG tube has a small diameter and a longer length, the formation of the chemical treatment lubricating coating requires a long time and a large amount of man-hours and a chemical agent used for the formation of the chemical treatment lubricating coating is comparatively expensive, which results in increasing an operating cost. Further, since an Ni-based alloy is used for the SG tube in many cases, the alloy is inhibitive for the chemical treatment lubricating coating to be formed on the surface of the alloy. Thus, in the case where the SG tube made of the Ni-based alloy is produced, the operating cost required for forming the chemical treatment lubricating coating is further increased.

Thus, in the drawing work for producing the SG tube made of the Ni-based alloy, a high-pressure drawing (forcibly lubricating drawing) is used in many cases. The high-pressure drawing is a kind of cold drawing in which a lubricating treatment is performed by a direct oil lubrication. The high-pressure drawing can stabilize the cold drawing and has a remarkable effect on the improvement of the quality of the drawn tube.

The drawing work of the tube by the high-pressure drawing is performed by the following steps of:

(1) filling a high-pressure container, into which a tube as workpiece is inserted, with a lubricating oil, and then pressurizing the lubricating oil by a pressure booster;

(2) forming a lubricating oil film between the tube and tools, i.e., a die and a plug, with the pressurized lubricating oil, the die being mounted in a leaktight manner onto an open end of the high-pressure container, the plug being securely disposed at a working position by the pressurized lubricating oil; and (3) drawing the tube in a state where the inner surface and the outer surface of the tube are forcibly lubricated by the formed lubricating oil film to finish the tube into a predetermined size by the tools.

As for the drawing work by such a high-pressure drawing, there have been proposed various methods. For example, there is proposed Patent Literature 1. In Patent Literature 1 is proposed a method for producing a tube having a small diameter and a longer length by the cold working using the high-pressure drawing, that is, a method for drawing a metal tube in which at least the last cold working including a wall thinning working is performed by a plug drawing using a high-pressure lubricating oil having a pressure of 500 kgf/cm² or more. In Patent Literature 1, it is described that since at least the last cold working including the wall thinning working is performed by the high-pressure drawing using the high-pressure lubricating oil, the produced metal tube does not cause seizing and hence can reduce a dimensional variation along an axial direction of the tube.

In Patent Literature 1, it is described that according to a method for drawing a metal tube, a dimensional variation along an axial direction of the produced metal tube can be reduced and hence noises generated by the dimensional variation in the metal tube can be prevented in the inner probe type eddy current flaw detection of the inner surface of the tube and hence a defect on the inner surface of the tube can be correctly detected on the basis of the output of a flaw detection device. However, a surface roughness $R_{MAX}$ (JIS 0601) of the inner surface of the tube, which is shown by an example of Patent Literature 1, is 2.8 to 4.0 μm and an S/N ratio is 13 to 18. These values are measured before the tube is straightened by a roll straightening machine, but after straightening, it is presumed that the surface roughness and the S/N ratio of the straightened metal tube should become smaller than these values.

On the other hand, an inclined roll type system in which a plurality of concave globoidal drum typed rolls are combined is generally employed as the configuration of a roll straightening machine used in a straightening process in producing an SG tube. The inclined roll type straightening machine includes various configurations in terms of the combination of the number of rolls, the alignment of the rolls (upper and lower direction, left and right direction), and the arrangement of the rolls (cross/opposite arrangement, zigzag arrangement). However, a roll straightening machine having the rolls arranged in a crossing manner as being opposite to each other is employed in a finishing process of the SG tube.

FIG. 2 is an illustration depicting a roll alignment example of an inclined roll type straightening machine. The roll straightening machine has a plurality of pairs of straightening rolls Ra, Rb (these rolls are collectively referred to as "R") arranged opposite to each other in a vertical direction in the state where rotating shafts cross each other. In the roll alignment shown in the drawing, three pairs of straightening rolls including entrance rolls Ra1, Rb1, center rolls Ra2, Rb2, and delivery rolls Ra3, Rb3 are arranged opposite to each other and an auxiliary roll Rc is arranged at the delivery side of the delivery rolls. A roll straightening machine having a roll alignment like this is usually referred to as a (2-2-2-1) type straightening machine.

A gap between opposite rolls and a cross angle of a pair of rolls Ra1, Rb1 can be individually adjusted. Further, vertical positions of paired straightening rolls Ra1, Rb1 and next paired rolls Ra2, Rb2 can also be individually adjusted. Yet further, a horizontal interval between paired straightening rolls Ra1, Rb1 and next paired rolls Ra2, Rb2, that is, a stand interval can also be individually adjusted.

When bends of the tube are straightened, a cross angle θ of the rotating shafts of the respective straightening rolls R to the tube to be straightened, that is, a roll angle is adjusted in such a way that the surface of the tube 1 to be straightened is along the surfaces of the straightening rolls. Further, the gap of opposite paired straightening rolls Ra1, Rb1 is set slightly smaller than the outside diameter of the tube 1 to be straightened to thereby apply crushing to the tube 1 to be straightened and the crush height of the straightening rolls Ra2, Rb2 arranged next to the straightening rolls Ra1, Rb1 is adjusted to thereby apply offsetting to the tube 1 to be straightened, whereby the bends and out-of-roundness of the tube 1 to be straightened can be straightened.

As for the method for straightening a tube by a roll straightening machine, there have been also proposed various methods. For example, there are proposed Patent Literatures 2 and 3. In Patent Literature 2 is proposed a method for straightening a tube by which an inspection of the tube can be performed at a high S/N ratio in the inner probe type eddy current flaw detection of the inner surface of the tube by the use of the straightening rolls in which at least an outside surface layer of a roll body is formed of an elastic member having a hardness Hs of 50 to 100 measured by a spring hardness test (A type) specified by JIS K 6301.

In an example in Patent Literature 2, a (2-2-2-1) type straightening machine is used as a roll straightening machine and an offset amount is set at a large amount of 10 to 11 mm. Moreover, in the example of Patent Literature 2, a variation in the outside size of a produced SG tube is shown and is 0.004 to 0.005 mm. However, a level of stress developed on the outer surface of tube by the cold working and the straightening is different from the case on an inner surface and hence a dimensional variation on the outer surface along a longitudinal direction of the tube is also different from the case on the inner surface. Thus, even if the tube is straightened by the roll straightening machine described in Patent Literature 2, it is not clear whether or not the dimensional variation along a longitudinal direction of the inner surface of the tube can be deterred. Further, the S/N ratio of the SG tube shown in embodiment examples of Patent Literature 2 is as low as 20 to 50.

According to a method for straightening a tube described in Patent Literature 3, a tube is straightened by at least three pairs of straightening rolls, each pair of rolls being arranged opposite to each other, that are disposed on a delivery side by applying offsetting to the tube, the offsetting being formed by three positions along a tube axial centerline, each position being a crossing position of upper and lower straightening rolls, wherein η specified by Formula (1) described below is set at $1.0 \times 10^{-3}$ to $1.5 \times 10^{-3}$.

$$\eta = (1/R) \times (d/2) \tag{1}$$

where given that d (mm) denotes an outside diameter of the tube, L (mm) denotes a stand interval of the roll straightening machine and δ (mm) denotes an offset amount, $R=(\delta^2+L^2)/2\delta$ is satisfied.

In Patent Literature 3, it is described that according to a method for straightening a tube, η specified by Formula (1) described above satisfies a predetermined range and hence it is possible to perform an inspection of the inner surface of the produced tube by the inner probe type eddy current flaw detection at a high S/N ratio. In an embodiment example of Patent Literature 3 is shown an S/N ratio of an SG tube which is straightened by the use of a (2-2-2-1) type straightening machine having three pairs of straightening rolls with an offset amount of 6 mm or more applied thereto, and the value of the S/N ratio is 32 to 91. Further, in the example of Patent Literature 3, a dimensional variation in the inner surface of the SG tube is not addressed.

When the SG tube is produced, bends and out-of-roundness are generated in the tube by a residual stress caused in the solid solution heat treatment process, so that the bends and out-of-roundness need to be straightened in the straightening process performed thereafter. However, according to the conventional method for straightening a tube described in Patent Literatures 2 or 3, when the bends and out-of-roundness of the tube are straightened by the (2-2-2-1) type straightening machine, it happens that the dimensional variation in the inner surface of the tube should become noticeable and hence should decrease an S/N ratio in an inspection by the eddy current flaw detection to reduce an inspection efficiency in some cases.

CITATION LIST

Patent Literature

Patent Literature 1: Japanese Patent Application Publication No. 03-18419
Patent Literature 2: Japanese Patent Application Publication No. 2000-317521
Patent Literature 3: International Application Publication No. WO2007/119817

SUMMARY OF INVENTION

Technical Problem

As described above, according to the conventional method for producing an SG tube by a production process including a cold working process, a solid solution heat treatment process, and a straightening process, the bends and out-of-roundness of the tube generated in the solid solution heat treatment need to be straightened in the straightening process performed after the solid solution heat treatment process. However, according to the conventional method for producing an SG tube, when the bending and the out-of-roundness of the tube are straightened, the dimensional variation in the inner surface of the tube becomes noticeable and hence decreases an S/N ratio in an inspection by an eddy current flaw detection to reduce an inspection efficiency in some cases.

The present invention has been made in view of this situation, and an object of the present invention is to provide a heat transfer tube for a steam generator that reduces a dimensional variation in the inner surface of the tube after a straightening process and makes it possible to inspect the tube at a high S/N ratio to thereby improve inspection efficiency, and a method for producing the same.

Solution to Problem

The present inventors studied an effect that the dimensional variation along a longitudinal direction of the inner surface of the tube affects an S/N ratio in the inspection of the inner surface of the tube and found that a certain dimensional variation with a short cycle has a small effect on the S/N ratio.

FIG. 3 is a graph showing one example of a roughness measurement chart in a longitudinal direction on an inner surface of a tube produced by a production process including a cold working process, a solid solution heat treatment process, and a straightening process. The roughness chart shown in the figure is a surface roughness of the inner surface of a tube produced and straightened in the example to be described later, the surface roughness being measured by a surface roughness measurement device (made by Tokyo Seimitsu Co., Ltd. Type: SURFCOM 1500SD3). When the surface roughness is measured, a contact probe made of diamond and shaped like a cone having a diameter of 4 μm and a vertical angle 60° was used as a detector.

As shown in FIG. 3, the roughness measurement chart along a longitudinal direction of the inner surface of the produced tube exhibits wave undulation that has a cycle of about 35 mm, with short-cycled variations as encircled by a double-dot and dash line being superimposed. The variations of a short cycle hardly affect the S/N ratio by the eddy current flaw detection, but the wave undulation having a long cycle terribly affects the S/N ratio. Here, in order to measure the wave undulation having a long cycle and exerting a big effect on the S/N ratio except the variations having a short cycle, it is effective to increase the diameter of the contact probe of the detector that is used at the time of measuring a dimensional variation along a longitudinal direction of the inner surface of the tube. Further, the present inventors found that in the wave undulation having a long cycle, the amplitude of variation in the wave undulation, that is, an amount of dimensional variation exerts a big effect on the S/N ratio.

FIG. 4 is a schematic illustration to depict an amount of dimensional variation along a longitudinal direction of the inner surface of a tube, which is specified by the present invention. The illustration shows a roughness measurement chart along a longitudinal direction of the inner surface of the tube, and a horizontal axis indicates positions (mm) in a longitudinal direction of the tube and a vertical axis indicates a height (μm). As for an amount of dimensional variation along a longitudinal direction of the inner surface of the tube, which is specified by the present invention, the roughness measurement chart is obtained by use of a detector whose contact probe has a radius of 0.8 mm to thereby find an amount of dimensional variation along a longitudinal direction of the inner surface of the tube. As shown in FIG. 4, a maximum value and a minimum value in a specific length of 50 mm taken from the roughness chart are determined and a difference between the maximum value and the minimum value is obtained as an amount of dimensional variation along a longitudinal direction of the inner surface of the tube.

As the result of an earnest study, the present inventors found that when an amount of dimensional variation along a longitudinal direction of the inner surface of the tube, which is shown in FIG. 4, is controlled to be 4 μm or less, an inspection of inner surface of the tube by the eddy current flaw detection can be made with a high S/N ratio to improve the inspection efficiency.

Further, an amount of dimensional variation along a longitudinal direction of the inner surface of the tube subjected to a straightening process correlates with an amount of dimensional variation prior to the straightening process and, in general, the amount of dimensional variation is increased by the straightening process. For example, when Pilger rolling is used in a cold working process, a noticeable dimensional variation is generated along a longitudinal direction of the inner surface of the tube in the cold working process and the noticeable dimensional variation remains also after the tube is straightened, which hence impairs the S/N ratio in the eddy current flaw detection.

In the cold working process, when drawing work is used, the dimensional variation generated along a longitudinal direction of the inner surface of the tube in the cold working process can be reduced as compared with the case where Pilger rolling is used. This is because since the drawing work is performed by use of a die and a plug, the inner surface of the produced tube can be made smoother. Further, when drawing work by a high-pressure drawing is used, the dimensional variation generated along a longitudinal direction of the inner surface of the tube in the cold working process can be further reduced. In this way, it was found that drawing work using a high-pressure lubricating oil having a pressure of 40 MPa or more is suitable for the cold working process.

The operating conditions of the roll straightening machine such as an offset amount, the number of pairs of straightening rolls (the number of stands), and a stand interval have a large effect on an increase in an amount of dimensional variation of the inner surface of the tube in the straightening process. For example, when the number of pairs of straightening rolls of the roll straightening machine is small, an amount of work per a pair of straightening rolls is increased and hence the tube is subjected to be deflected heavily when the tube is straightened, whereby an amount of dimensional variation of the tube after the straightening is markedly increased. Hence, the present inventors found that when a (2-2-2-2-2) type straightening machine having five pairs of straightening rolls is used, the amount of work per one pair of straightening rolls can be decreased to prevent the amount of dimensional variation along a longitudinal direction of the inner surface of the tube from being increased by the straightening.

The present invention was completed on the basis of the findings described above and summaries of the present invention are a heat transfer tube for a steam generator described in the following (1) to (4) and a method for producing a heat transfer tube for a steam generator described in the following (5) and (6).

(1) A heat transfer tube for a steam generator, wherein an amount of dimensional variation in a specific length of 50 mm taken from a roughness measurement chart, which is obtained by measuring a surface roughness of an inner surface of the tube along a longitudinal direction, is 4 μm or less and an amount of bend crookedness in a portion of a length of 1000 mm from a tube end is 1 mm or less.

(2) The heat transfer tube for a steam generator according to (1) described above, wherein the tube is produced by the steps of: cold drawing by use of a high-pressure lubricating oil of 40 MPa or more in pressure; solid solution heat treatment; and straightening by a roll straightening machine.

(3) The heat transfer tube for a steam generator according to (2) described above, wherein the roll straightening machine uses at least five pairs of concave globoidal drum type straightening rolls, each pair of rolls being arranged opposite to each other in a vertical direction and in a crossing manner where directions of rotating shafts cross each other.

(4) The heat transfer tube for a steam generator according to any one of (1) to (3) described above, wherein chemical composition of the tube consists of, in mass %, C: 0.15% or less, Si: 1.00% or less, Mn: 2.0% or less, P: 0.030% or less, S: 0.030% or less, Cr: 10.0 to 40.0%, Ni: 8.0 to 80.0%, Ti: 0.5% or less, Cu: 0.6% or less, Al: 0.5% or less, and N: 0.20% or less, the balance being Fe and impurities.

(5) A method for producing a heat transfer tube for a steam generator, wherein when a tube subjected to cold drawing by use of a high-pressure lubricating oil of 40 MPa or more in pressure and to solid solution heat treatment is straightened by use of a roll straightening machine in which at least five pairs of concave globoidal drum type straightening rolls are provided, each pair of rolls being arranged opposite to each other in a vertical direction and in a crossing manner where directions of rotating shafts cross each other, and in which a stand interval is set at 300 mm or less, the tube is subjected to offsetting that is formed by three points literally along a tube axial centerline as being crossing positions of at least successive three pairs of upper and lower straightening rolls of the roll straightening machine and that allows η expressed by Formula (1) described below to satisfy $0.9 \times 10^{-3}$ or more and to ensure an offset amount of 5 mm or less:

$$\eta = 1/R \times (d/2) \tag{1}$$

where given that an outside diameter of the tube is d (mm) and a stand interval of the roll straightening machine is L (mm) and an offset amount is δ (mm), $R = (\delta^2 + L^2)/2\delta$ is established.

(6) The method for producing a heat transfer tube for a steam generator according to (5) described above, wherein chemical composition of the tube consists of, in mass %, C: 0.15% or less, Si: 1.00% or less, Mn: 2.0% or less, P: 0.030% or less, S: 0.030% or less, Cr: 10.0 to 40.0%, Ni: 8.0 to 80.0%, Ti: 0.5% or less, Cu: 0.6% or less, Al: 0.5% or less, and N: 0.20% or less, the balance being Fe and impurities.

Advantageous Effects of Invention

In the heat transfer tube for a steam generator according to the present invention, an amount of dimensional variation along a longitudinal direction of the inner surface of the tube is 4 μm or less, so that when the tube is produced, an inspection of the tube by the eddy current flaw detection can be performed with a high S/N ratio and hence the inspection efficiency can be improved.

The method for producing a heat transfer tube for a steam generator according to the present invention has marked effects described below.

(1) Since the cold drawing is applied to the tube by use of the high-pressure lubricating oil of 40 MPa or more in pressure, an amount of dimensional variation along a longitudinal direction of the inner surface of the tube after the cold drawing and before the straightening can be reduced.

(2) The tube is straightened by use of the roll straightening machine having at least five pairs of concave globoidal drum type straightening rolls and a stand interval of 300 mm or less with η set at $0.9 \times 10^{-3}$ or more and with an offset amount set at 5 mm or less by at least three pairs of straightening rolls in a row. This can reduce an increase in the amount of dimensional variation along a longitudinal direction of the inner surface of the tube by the straightening.

(3) The method for producing a heat transfer tube for a steam generator in accordance with the present invention, as described above in (1) and (2), can produce a tube in which an amount of dimensional variation along a longitudinal direction of the inner surface of the tube is 4 μm or less and in which an amount of bend crookedness in a portion of a length of 1,000 mm from a tube end is 1 mm or less.

DESCRIPTION OF EMBODIMENTS

Hereinafter, a heat transfer tube for a steam generator and a method for producing the same will be described.
[Heat Transfer Tube for Steam Generator]

A heat transfer tube for a steam generator according to the present invention is characterized in that an amount of dimensional variation in a specific length of 50 mm taken from a roughness measurement chart, which is obtained by measuring a surface roughness of an inner surface of the tube along a longitudinal direction, is 4 μm or less and that an amount of bend crookedness in a portion of a length of 1000 mm from a tube end is 1 mm or less.

Figure 1:
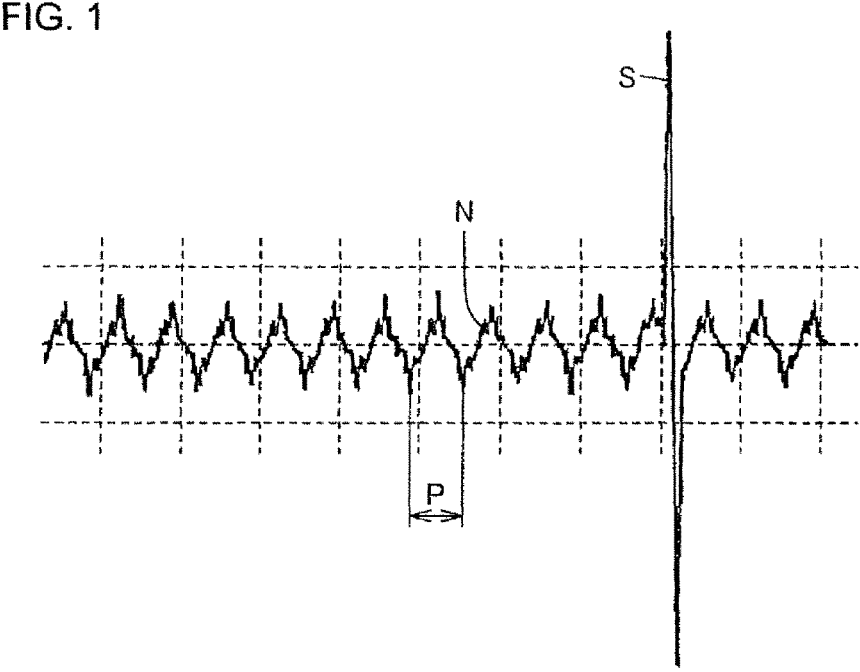
FIG. 1 is an example of a chart showing the result of an inner probe type eddy current flaw detection of an inner surface of a tube.
Figure 2:
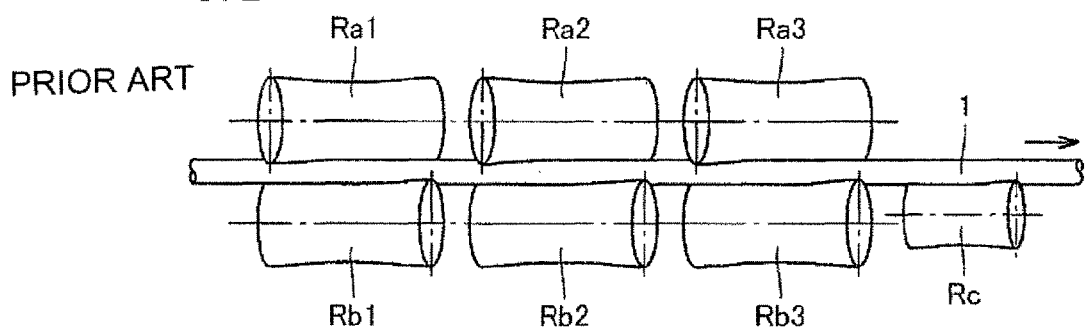
FIG. 2 is an illustration depicting a roll alignment example of an inclined roll type straightening machine.
Figure 3:
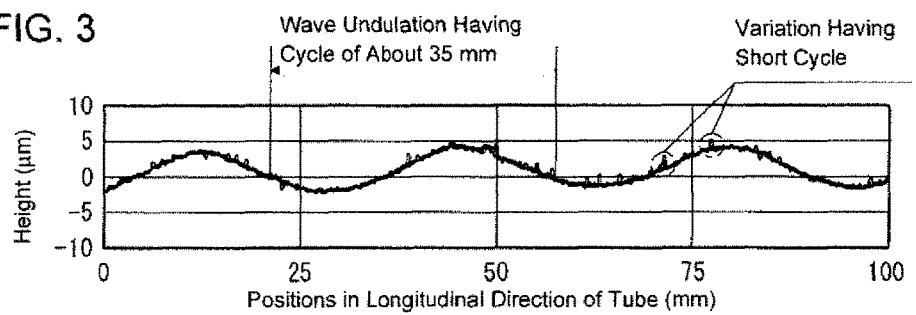
FIG. 3 is a graph showing one example of a roughness measurement chart along a longitudinal direction of an inner surface of a tube produced by a production process including a cold working process, a solid solution heat treatment process, and a straightening process.
Figure 4:
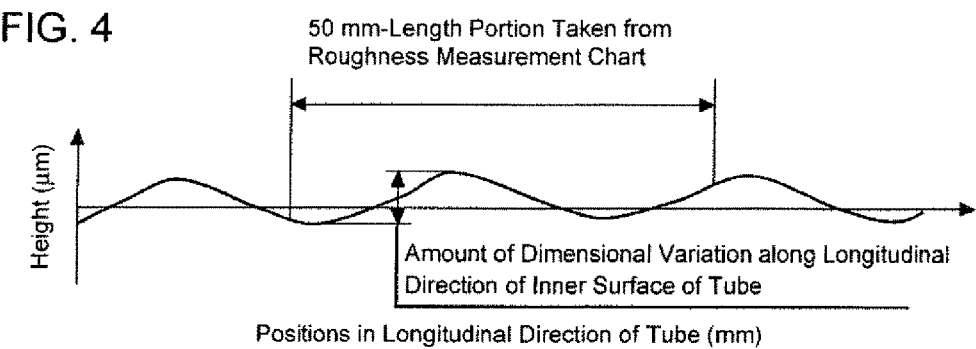
FIG. 4 is a schematic illustration to depict an amount of dimensional variation along a longitudinal direction of the inner surface of the tube, which is discussed by the present invention.

In the present invention, when the surface roughness of the inner surface of the tube is measured along a longitudinal direction, a dimensional variation along a longitudinal direction of the inner surface of the tube shall be measured by use of a detector having a contact probe of 0.8 mm in radius. As described above with reference to FIG. 4, this is because short-cycled variations having a little effect on an S/N ratio in an eddy current flaw detection are to be removed to thereby measure wave undulation with a long cycle. Further, in the present invention, "an amount of dimensional variation" means a difference between a maximum value and a minimum value in a specific length of 50 mm taken from the measured roughness chart.

The dimensional variation along a longitudinal direction of the inner surface of the tube is generated and increased by Pilger rolling and drawing work in a cold working process or by straightening by a roll straightening machine in a straightening process. The dimensional variation generated and increased as such is known to have a cycle of 50 mm or less, so that an amount of dimensional variation is determined from a specific length of 50 mm taken from the measured surface roughness chart.

When the amount of dimensional variation along a longitudinal direction of the inner surface of an SG tube is more than 4 μm, the S/N ratio in the eddy current flaw detection is decreased to thereby impair the inspection efficiency. When the amount of dimensional variation along a longitudinal direction of the inner surface of the SG tube is 4 μm or less, an inspection by the eddy current flaw detection can be performed with a high S/N ratio and hence the inspection efficiency can be improved.

Further, in the case where an amount of bend crookedness in a portion of a length of 1000 mm from a tube end, that is, in a range of 1000 mm from the tube end is controlled to be 1 mm or less, in assembling tubes into a steam generator/heat exchanger, the interference of the tube with other parts attributable to such bend crookedness of the tube can be inhibited and hence an assembling operation can be readily performed.
[Method for Producing Heat Transfer Tube for Steam Generator]

A method for producing a heat transfer tube for a steam generator according to the present invention is characterized by the following: when a tube subjected to cold drawing by use of a high-pressure lubricating oil of 40 MPa or more in pressure and to solid solution heat treatment is straightened by use of a roll straightening machine in which at least five pairs of concave globoidal drum type straightening rolls are provided, each pair of rolls being arranged opposite to each other in a vertical direction and in a crossing manner where directions of rotating shafts cross each other, and in which a stand interval is set at 300 mm or less, the tube is subjected to offsetting that is formed by three points literally along a tube axial centerline as being crossing positions of at least successive three pairs of upper and lower straightening rolls of the roll straightening machine and that allows r, expressed by Formula (1) described below to satisfy $0.9 \times 10^{-3}$ or more and to ensure an offset amount of 5 mm or less $$\eta = 1/R \times (d/2) \tag{1}$$

where given that an outside diameter of the tube is d (mm), a stand interval of the roll straightening machine is L (mm) and an offset amount is δ (mm), $R=(\delta^2+L^2)/2\delta$ is established.

When the tube is subjected to the drawing work by a high-pressure drawing by e use of the high-pressure lubricating oil of 40 MPa or more in pressure in the cold working process, an amount of dimensional variation along a longitudinal direction generated on the inner surface of the tube after the cold working (before straightening) can be reduced as compared with the case where the tube is subjected to Pilger rolling or drawing work under a lubrication treatment by a chemical treatment lubricating coating.

When the pressure of the lubricating oil used in the cold drawing by the high-pressure drawing is less than 40 MPa, a lubricating oil film having a sufficient thickness is not formed between tools and the tube and hence seizing and/or vibration/chattering is caused, which hence increases the amount of dimensional variation along a longitudinal direction generated on the inner surface of the tube. For this reason, the pressure of the lubricating oil is set at 40 MPa or more. It is preferable that the pressure of the lubricating oil is set at 50 MPa or more. Further, it is preferable that the pressure of the lubricating oil is set at 150 MPa or less. When the pressure of the lubricating oil is more than 150 MPa, there is a risk that part of the lubricating oil is trapped in a portion on the inner surface of the tube to form a recessed portion to thereby generate a defect referred to as an oil pit. The oil pit generated on the inner surface of the tube develops dimensional variations of a short cycle in a roughness measurement chart and hence has a small effect on the S/N ratio in the inspection by the eddy current flaw detection, but causes the roughness on the inner surface of the tube, referred to as an arithmetic average roughness, to be deteriorated.

Various conventional methods can be employed as a solid solution heat treatment, and when the solid solution heat treatment is performed, a heating temperature and a retention time thereof for the tube can be adequately determined from the size and the chemical composition of the tube. The solid solution heat treatment can be applied to the tube, for example, at a heating temperature of 1000 to 1300° C. and for a retention time of 5 to 15 min.

In the straightening process, the tube is straightened by use of the roll straightening machine which has at least five pairs of concave globoidal drum type straightening rolls, each pair of rolls being arranged opposite to each other in a vertical direction and in a crossing manner where directions of rotating shafts of paired rolls cross each other, and which has the stand interval of 300 mm or less. Since the roll straightening machine which has at least five pairs of concave globoidal drum type straightening rolls is used, the bends and the out-of-roundness of the tube can be straightened while an amount of work per a pair of straightening rolls is decreased as compared with a conventional (2-2-2-1) type straightening machine which has three pairs of straightening rolls. In the case where the stand interval is more than 300 mm, the bends of the tube cannot be straightened unless an offset amount is increased, but increasing the offset amount so as to straighten the bends of the tube should increase an amount of dimensional variation in the inner surface of the tube after straightening.

When the q expressed by Formula (1) described above is in the range of $0.9\times10^{-3}$ or more, the out-of-roundness and the bends of the tube can be straightened. On the other hand, if the η expressed by Formula (1) described above is less than $0.9\times10^{-3}$, the bends remain in the tube after being subjected to the straightening process, thus resulting in a defective product.

When the offset amount applied to the tube is 5 mm or less, an amount of work per a pair of straightening rolls is decreased and hence the imposed deflection of the tube is decreased at the time of straightening, which can hence suppress an increase in an amount of dimensional variation along a longitudinal direction of the inner surface of the tube by the straightening. When the offset amount applied to the tube is more than 5 mm, the amount of dimensional variation along a longitudinal direction of the inner surface of the tube by the straightening is noticeably increased.

According to the method for producing a heat transfer tube for a steam generator in accordance with the present invention, the cold drawing is performed to the tube by use of the high-pressure lubricating oil of 40 MPa or more in pressure and then the tube is straightened with offsetting in which the η expressed by Formula (1) described above is in the range of $0.9\times10^{-3}$ or more and in which an offset amount is 5 mm or less. In the heat transfer tube for a steam generator produced as such, an amount of dimensional variation along a longitudinal direction of the inner surface of the tube is 4 μm or less and the amount of bend crookedness in a portion of a length of 1000 mm from a tube end is 1 mm or less, which hence makes it possible to inspect the tube by the eddy current flaw detection with a high S/N ratio and hence can improve the inspection efficiency.

For example, in the case where the tube is straightened by use of a (2-2-2-2-2) type straightening machine having five pairs of straightening rolls, at least successive three pairs of straightening rolls in which η and the offset amount are set within ranges specified by the present invention can be arranged either on an entrance side, or in the intermediate region excluding foremost and rearmost pairs of rolls, or on a delivery side.

Further, a straightening roll cross angle and an amount of crushing that are setup conditions of the roll straightening machine can be selected adequately from the size and material grade of the tube to be straightened. It is preferable that in each pair of straightening rolls, the roll cross angle is set in a range from 28° to 31° and the amount of crushing is set in a range from 1.5 mm to 3.0 mm.

[Chemical Composition of Tube]

In the heat transfer tube for a steam generator according to the present invention and in the method for producing the same, it is preferable that the chemical composition of the tube consists of, in mass %, C: 0.15% or less, Si: 1.00% or less, Mn: 2.0% or less, P: 0.030% or less, S: 0.030% or less, Cr: 10.0 to 40.0%, Ni: 8.0 to 80.0%: Ti 0.5% or less, Cu: 0.6% or less, Al: 0.5% or less, and N: 0.20% or less, the balance being Fe and impurities.

Here, the impurities mean constituents which are mixed in the tube from ores and/or scraps when the tube is commercially produced and which are allowed in a range not having an adverse effect on the present invention. The reasons of limiting the contents of the respective elements are as follows. Here, in the following description. "%" of the content of the element means "mass %".

C: 0.15% or Less

If a C content is more than 0.15%, it is likely that stress corrosion cracking resistance can be deteriorated. Thus, when C is contained, it is preferable that the content of C is 0.15% or less, more preferably, 0.06% or less. Here, C has an effect of increasing the grain boundary strength of an alloy. In order to acquire this effect, it is preferable that the content of C is 0.01% or more.

Si: 1.00% or Less

Si is used as a deoxidizer at the time of melting and remains as impurities in the alloy. At this time, it is preferable that the content of Si is limited to 1.00% or less. If the content of Si is more than 0.50%, the cleanliness of the alloy is lowered in some cases. Thus, it is more preferable that the content of Si is limited to 0.50% or less.

Mn: 2.0% or Less

Mn is an element that immobilizes S, an impurity element, as MnS to thereby improve hot workability and that is effective as a deoxidizer. If the content of Mn is more than 2.00%, the cleanliness of the alloy is lowered. Thus, it is preferable that the content of Mn is 2.0% or less, more preferably, 1.0% or less. Further, in the case of acquiring the effect of improving the hot workability by Mn, it is preferable that the content of Mn is 0.1% or more.

P: 0.030% or Less

P is an element that remains as impurity in the alloy and if the content of P is more than 0.030%, P has an adverse effect on a corrosion resistance in some cases. Thus, it is preferable that the content of P is limited to 0.030% or less.

S: 0.030% or Less

S is an element that remains as impurity in the alloy and when the content of S is more than 0.030%, S has an adverse effect on the corrosion resistance in some cases. Thus, it is preferable that the content of S is limited to 0.030% or less.

Cr: 10.0 to 40.0%

Cr is an element necessary for keeping the corrosion resistance of the alloy and hence it is preferable that the content of Cr is 10.0% or more. However, containing Cr by more than 40.0% means that the content of Ni gets relatively smaller and hence it is likely to lower the corrosion resistance and the hot workability of the alloy. Thus, it is preferable that the content of Cr is 10.0 to 40.0%. In particular, if the content of Cr is 14.0 to 1.7.0%, the alloy exhibits excellent corrosion resistance in the environment including chloride, and if the content of Cr is 27.0 to 31.0%, the alloy is excellent in the corrosion resistance even in the environment including pure water and alkali at high temperatures.

Ni: 8.0 to 80.0%

Ni is an element necessary for securing the corrosion resistance of the alloy and it is preferable that the content of Ni is 8.0% or more. On the other hand, since Ni is expensive, it is enough that a minimum content of Ni as needed is contained according to use and hence it is preferable that the content of Ni is 80.0% or less.

Ti: 0.5% or Less

If the content of Ti is more than 0.5%, it is likely that the cleanliness of the alloy is deteriorated. Thus, it is preferable that the content of Ti is 0.5% or less and, more preferably, 0.4% or less. However, from the viewpoint of improving workability of the alloy and of inhibiting a grain growth at the time of welding, it is preferable that the content of Ti is 0.1% or more.

Cu: 0.6% or Less

Cu is an element that remains as impurity in the alloy, and if the content of Cu is more than 0.6%, the corrosion resistance of the alloy is lowered in some cases. Thus, it is preferable that the content of Cu is limited to 0.6% or less.

Al: 0.5% or Less

Al is used as a deoxidizer at the time of steelmaking and remains as impurity in the alloy. The remaining Al becomes oxide-based inclusions in the alloy and lowers the cleanliness of the alloy. Hence, it is likely that Al has an adverse effect on the corrosion resistance and the mechanical property of the alloy. Thus, it is preferable that the content of Al is limited to 0.5% or less.

N: 0.20% or Less

N may not be added to the alloy but the alloy intended by the present invention typically contains about 0.01% of N as impurity. However, if N is positively added to the alloy, N can increase the strength of the alloy without impairing the corrosion resistance. However, when the content of N is more than 0.20%, the corrosion resistance is lowered. Thus, it is preferable that the upper limit of the content of N is 0.20%.

In the heat transfer tube for a steam generator according to the present invention and in the method for producing the same, it is preferable that a Ni-based alloy having chemical composition consisting of C: 0.15% or less, Si: 1.00% or less, Mn: 2.0% or less, P: 0.030% or less, S: 0.030% or less, Cr: 10.0 to 40.0%, Fe: 15.0% or less, Ti: 0.5% or less, Cu: 0.6% or less, Al: 0.5% or less, the balance being Ni and impurities because the Ni-based alloy is more excellent in the corrosion resistance.

The typical Ni-based alloy having the above-mentioned chemical composition and preferably used for the tube will include two kinds of alloys described below.

(a) Ni-based alloy consisting of C: 0.15% or less, Si: 1.00% or less, Mn: 2.0% or less, P: 0.030% or less, S: 0.030% or less, Cr: 14.0 to 17.0%, Fe: 6.0 to 10.0%, Ti: 0.5% or less, Cu: 0.6% or less, Al: 0.5% or less, the balance being Ni and impurities.

(b) Ni-based alloy consisting of C: 0.06% or less, Si: 1.00% or less, Mn: 2.0% or less, P: 0.030% or less, S: 0.030% or less, Cr: 27.0 to 31.0%, Fe: 7.0 to 11.0%, Ti: 0.5% or less, Cu: 0.6% or less, Al: 0.5% or less, the balance being Ni and impurities.

The alloy (a) described above contains 14.0 to 17.0% of Cr and about 75% of Ni, so that the alloy (a) is excellent in the corrosion resistance in the environment including the chloride. In this alloy, it is preferable that the content of Fe is 6.0 to 10.0% from the viewpoint of the balance of the content of Ni and the content of Cr.

The alloy (b) described above contains 27.0 to 31.0% of Cr and about 60% of Ni, so that the alloy (b) is excellent in the corrosion resistance not only in the environment including chloride but also in the environment including pure water and alkali at high temperatures. Also in this alloy, it is preferable that the content of Fe is 7.0 to 1.0% from the viewpoint of the balance of the content of Ni and the content of Cr.

EXAMPLES

Tests for verifying effects of the heat transfer tube for a steam generator according to the present invention and the method for producing the same were conducted.

[Test Procedure]

A tube was acquired by a cold working process of finishing the tube into a predetermined size, a solid solution heat treatment process, and a straightening process using a roll straightening machine for straightening bends and the out-of-roundness of the tube. In the cold working process, the tube was finished into a predetermined size by Pilger rolling or drawing work (high-pressure drawing) using a high-pressure lubricating oil of 120 MPa in pressure. In the straightening process, a (2-2-2-1) type straightening machine having three pairs of straightening rolls or a (2-2-2-2-2) type straightening machine having five pairs of straightening rolls was used.

Test conditions are as follows.

Chemical Composition of Tube:

Material grade: Ni-based alloy specified by ASME SB-163 UNS N06690

Ni-based alloy consisting of, in mass %, C: 0.021%, Si: 0.33%, Mn: 027%, P: 0.013%, S: 0.0002%, Cr: 29.4%, Fe: 9.8%, Ti: 0.25%, Cu: 0.03%, and Al: 0.11%, the balance being Ni and impurities.

Solid solution heat treatment was performed at 1100° C. for three minutes.

Tube A and Tube B of Ni-based alloys, which had the chemical composition shown in the above test conditions and were different from each other in size, were tested. The Tube A had an outside diameter of 19.14 mm, a thickness of 1.125 mm, and a length of 10,000 mm (10 m). The Tube B had an outside diameter of 17.57 mm, a thickness of 1.05 mm, and a length of 10,000 mm (10 m).

In Table 1 and Table 2, shown are test number, test category, tube tested, finishing method in cold working process, an amount of dimensional variation along a longitudinal direction of inner surface of tube after cold working process and before straightening, straightening conditions, and test results. As for the straightening conditions, the number of pairs of straightening rolls of the roll straightening machine, the stand interval, the offset amount set for successive three pairs of straightening rolls, and the value of η calculated by Formula (1) described above are shown in Table 1 and Table 2. Here, in the tests using the (2-2-2-2-2) type straightening machine having five pairs of straightening rolls, the value of η and the offset amount shown in Table 1 and Table 2 are set for successive three pairs of straightening rolls which were arranged in the intermediate region excluding foremost and rearmost pairs of rolls.

TABLE 1

| | | | | Before straightening | Straightening conditions | | | | Test results (after straightening) | | | |
|---|---|---|---|---|---|---|---|---|---|---|---|---|
| Test No. | Category | Tube tested | Cold working process | Amount of dimensional variation in longitudinal direction of inner surface of tube (μm) | Number of pairs of rolls (pair) | Stand interval (mm) | Offset amount (mm) | η (×10$^{-3}$) | Remaining bends | Amount of dimensional variation in longitudinal direction of inner surface of tube (μm) | S/N ratio | Overall evaluation |
| 1 | Comparative example | A | Pilger rolling | 7.5 | 3 | 380 | 4 | 0.53 | x | 7.5 | 12 | x |
| 2 | Comparative example | A | | 6.5 | 3 | 380 | 5 | 0.66 | x | 6.5 | 15 | x |
| 3 | Comparative example | A | | 8.0 | 3 | 380 | 6 | 0.80 | x | 8.5 | 8 | x |
| 4 | Comparative example | A | | 7.5 | 3 | 380 | 9 | 1.19 | ○ | 8.5 | 9 | x |
| 5 | Comparative example | A | | 6.5 | 3 | 380 | 10 | 1.32 | ○ | 8.0 | 11 | x |
| 6 | Comparative example | A | High-pressure drawing | 1.0 | 3 | 380 | 4 | 0.53 | x | 2.0 | 88 | x |
| 7 | Comparative example | A | | 1.0 | 3 | 380 | 5 | 0.66 | x | 3.0 | 78 | x |
| 8 | Comparative example | A | | 1.0 | 3 | 380 | 6 | 0.80 | x | 3.5 | 75 | x |
| 9 | Comparative example | A | | 1.0 | 3 | 380 | 9 | 1.19 | ○ | 6.5 | 25 | x |
| 10 | Comparative example | A | | 1.0 | 3 | 380 | 10 | 1.32 | ○ | 7.0 | 21 | x |
| 11 | Comparative example | A | Pilger rolling | 7.5 | 5 | 270 | 2 | 0.53 | x | 7.5 | 15 | x |
| 12 | Comparative example | A | | 6.5 | 5 | 270 | 3 | 0.79 | x | 6.5 | 13 | x |
| 13 | Comparative example | A | | 8.0 | 5 | 270 | 4 | 1.05 | ○ | 8.0 | 10 | x |
| 14 | Comparative example | A | | 7.5 | 5 | 270 | 5 | 1.31 | ○ | 8.5 | 7 | x |
| 15 | Comparative example | A | High-pressure drawing | 1.0 | 5 | 270 | 2 | 0.53 | x | 1.5 | 95 | x |
| 16 | Comparative example | A | | 1.0 | 5 | 270 | 3 | 0.79 | x | 1.5 | 98 | x |
| 17 | Inventive example | A | | 1.0 | 5 | 270 | 4 | 1.05 | ○ | 2.5 | 75 | ○ |
| 18 | Inventive example | B | | 1.0 | 5 | 270 | 4 | 0.96 | ○ | 2.0 | 81 | ○ |
| 19 | Inventive example | A | | 1.0 | 5 | 270 | 5 | 1.31 | ○ | 2.5 | 65 | ○ |
| 20 | Inventive example | B | | 1.0 | 5 | 270 | 5 | 1.20 | ○ | 2.0 | 79 | ○ |
| 21 | Comparative example | A | | 1.0 | 5 | 270 | 6 | 1.57 | ○ | 5.0 | 34 | x |

TABLE 2

| | | | | Before straightening | Straightening condition | | | | Test results (after straightening) | | | |
|---|---|---|---|---|---|---|---|---|---|---|---|---|
| Test No. | Category | Tube tested | Cold working process | Amount of dimensional variation in longitudinal direction of inner surface of tube (μm) | Number of pairs of rolls (pair) | Stand interval (mm) | Offset amount (mm) | η (×10$^{-3}$) | Remaining bends | Amount of dimensional variation in longitudinal direction of inner surface of tube (μm) | S/N ratio | Overall evaluation |
| 22 | Comparative example | A | Pilger rolling | 7.5 | 5 | 240 | 2 | 0.66 | x | 7.5 | 18 | x |
| 23 | Comparative example | A | | 6.5 | 5 | 240 | 3 | 1.00 | ○ | 6.5 | 12 | x |

TABLE 2-continued

| | | | Before straightening | | | | | Test results (after straightening) | | | |
|---|---|---|---|---|---|---|---|---|---|---|---|
| | | | Amount of dimensional variation in | Straightening condition | | | | Amount of dimensional variation in longitudinal | | | |
| Test No. | Category | Tube tested | Cold working process | longitudinal direction of inner surface of tube (μm) | Number of pairs of rolls (pair) | Stand interval (mm) | Offset amount (mm) | η (×10⁻³) | Remaining bends | direction of inner surface of tube (μm) | S/N ratio | Overall evaluation |
| 24 | Comparative example | A | | 8.0 | 5 | 240 | 4 | 1.33 | ○ | 8.5 | 7 | x |
| 25 | Comparative example | A | | 7.5 | 5 | 240 | 5 | 1.66 | ○ | 8.5 | 8 | x |
| 26 | Comparative example | A | High-pressure drawing | 1.0 | 5 | 240 | 2 | 0.66 | x | 1.5 | 88 | x |
| 27 | Inventive example | A | | 1.0 | 5 | 240 | 3 | 1.00 | ○ | 2.5 | 85 | ○ |
| 28 | Inventive example | A | | 1.0 | 5 | 240 | 4 | 1.33 | ○ | 2.5 | 76 | ○ |
| 29 | Inventive example | B | | 1.0 | 5 | 240 | 4 | 1.22 | ○ | 2.0 | 77 | ○ |
| 30 | Inventive example | A | | 1.0 | 5 | 240 | 5 | 1.66 | ○ | 3.0 | 58 | ○ |
| 31 | Inventive example | B | | 1.0 | 5 | 240 | 5 | 1.52 | ○ | 2.5 | 64 | ○ |
| 32 | Comparative example | A | | 1.0 | 5 | 240 | 6 | 1.99 | ○ | 5.5 | 25 | x |

[Evaluation Criterion]

In each test, an amount of dimensional variation in the inner surface of the tube subjected to the cold working was measured before and after the tube was subjected to the straightening. Further, an S/N ratio of the tube subjected to the straightening was measured by the eddy current flaw detection and remaining bends of the tube was evaluated. Still further, an overall evaluation of the tube was made on the basis of the results of remaining bends, the amount of dimensional variation along a longitudinal direction of the inner surface of the tube subjected to the straightening, and the S/N ratio.

The amount of dimensional variation is a difference between a maximum value and a minimum value in a specific length of 50 m taken from a roughness measurement chart, which was obtained by measuring the surface roughness of the inner surface of the tube by use of a surface roughness measurement device (made by Tokyo Seimitsu Co., Ltd. Type: SURFCOM 1500SD3). When the surface roughness was measured, a detector having a contact probe of 0.8 mm in radius was used.

The S/N ratio was determined in the following manner, the inner surface of the tube was inspected by use of the eddy current flaw detection under conditions of a frequency of 600 kHz and a type of detecting local differential by using a drilled through-hole having a diameter of 0.66 mm φ as a standard notch; to thereby obtain values of S/N ratio where the total length of tube is subdivided into one-foot-length portions and an individual value of S/N ratio is determined for each portion: and among obtained values of S/N ratio, a minimum value was regarded as the S/N ratio of the tube.

As for remaining bends, particularly, the bend crookedness near an end of the tube (hereinafter also referred to as "nose bend") was observed as the bend of the tube subjected to the straightening. The meanings of signs in the column of [Remaining bends] in Table 1 and Table 2 are as follows:

○: the amount of bend crookedness in a portion of a length of 1000 mm from a tube end was 1 mm or less and hence the bends of the tube are considered as being sufficiently straightened, and x: the amount of bend crookedness was more than 1 mm for the portion as above and hence the bends of the tube are considered as being insufficiently straightened.

The meanings of signs in the column of [Overall evaluation] in Table 1 and Table 2 are as follows:

○: the evaluation of remaining bends of the tube subjected to the straightening was good (○), the amount of dimensional variation along a longitudinal direction of the inner surface of the tube was 4 μm or less, and the S/N ratio was 50 or more.

x: any one of the following conditions was not satisfied: that is, (Condition 1) the evaluation of remaining bends of the tube subjected to the straightening was good (○); (Condition 2) the amount of dimensional variation along a longitudinal direction of the inner surface of the tube was 4 μm or less; and (Condition 3) the S/N ratio was 50 or more.

[Test Results]

As shown in Table 1 and Table 2, in all of Test Nos. 1 to 5, 11 to 14, and 22 to 25, which are comparative examples, Pilger rolling was employed as the cold working process and the amount of dimensional variation along a longitudinal direction of the inner surface of the tube not yet subjected to the straightening was 4 μm or more. For this reason, in all of Test Nos. 1 to 5, 11 to 14, and 22 to 25, irrespective of the straightening conditions including the number of pairs of straightening rolls and the stand interval of the straightening machine, the offset amount, and the value of η, the amount of dimensional variation along a longitudinal direction of the inner surface of the tube subjected to the straightening was more than 4 μm in any of the tests and hence the overall evaluations were all x.

In Test Nos. 6 to 10 of comparative examples, the tube was subjected to the cold drawing by the high-pressure drawing using the lubricating oil of 40 MPa or more in pressure, and a (2-2-2-1) type straightening machine having three pairs of straightening rolls and having a stand interval set at 380 mm was used. In all of Test Nos. 6 to 10, the amount of dimensional variation along a longitudinal direction of the inner surface of the tube before straightening was 1.0 μm.

Of these tests, in Test Nos. 9 and 10, the offset amount was set at 9 or 10 mm and η was set at $1.19 \times 10^{-3}$ or $1.32 \times 10^{-3}$, whereby the amount of working per each pair of straightening rolls was increased as compared with the conditions specified by the present invention. As a result, remaining bends of the tube subjected to the straightening became ○ but the amount of dimensional variation along a longitudinal direction of the inner surface of the tube increased and became more than 4 μm, so that the overall evaluation became x. Further, in Test Nos 6 to 8, the offset amount was set at 4 to 6 mm and q was set at $0.53 \times 10^{-3}$ to $0.80 \times 10^{-3}$, whereby the amount of working per each pair of straightening rolls was decreased. As a result, the amount of dimensional variation along a longitudinal direction of the inner surface of the tube subjected to the straightening became 4 μm or less but remaining bends of the tube subjected to the straightening became x, so that the overall evaluation became x.

In Test Nos. 15, 16, and 21, which are comparative examples, the tube was subjected to the cold drawing by the high-pressure drawing using the lubricating oil of 40 MPa or more in pressure and a (2-2-2-2-2) type straightening machine having five pairs of straightening rolls and having a stand interval set at 270 mm was used. In all of Test Nos. 15, 16, and 21, the amount of dimensional variation along a longitudinal direction of the inner surface of the tube before straightening was 1.0 μm.

Of these tests, in Test Nos. 15 and 16, the offset amount was set at 2 or 3 mm, which is within the range specified by the present invention, but η was set at $0.53 \times 10^{-3}$ or $0.79 \times 10^{-3}$, which is outside the range specified by the present invention. In these cases, the amount of dimensional variation along a longitudinal direction of the inner surface of the tube subjected to the straightening became 4 μm or less in both cases but the remaining bends evaluation became x, so that the overall evaluation became x. Further, in Test No 21, η was set at $1.57 \times 10^{-3}$, which is within the range specified by the present invention, but the offset amount was set at 6 mm, which is outside the range specified by the present invention. In this case, the remaining bend evaluation of the tube subjected to the straightening became ○ but the amount of dimensional variation along a longitudinal direction of the inner surface of the tube became more than 4 μm, so that the overall evaluation became x.

In Test Nos. 26 and 32, which are comparative examples, the tube was subjected to the cold drawing by the high-pressure drawing using the lubricating oil of 40 MPa or more in pressure and the (2-2-2-2-2) type straightening machine having five pairs of straightening rolls and having a stand interval set at 240 mm was used. In both of Test Nos. 26, and 32, the amount of dimensional variation along a longitudinal direction of the inner surface of the tube before straightening was 1.0 μm.

Of these tests, in Test No. 26, the offset amount was set at 2 mm, which is within the range specified by the present invention, but TI was set at $0.66 \times 10^{-3}$, which is outside the range specified by the present invention. In this case, the amount of dimensional variation along a longitudinal direction of the inner surface of the tube subjected to the straightening became 4 μm or less but the remaining bend evaluation became x, so that the overall evaluation became x. Further, in Test No 32, η was set at $1.99 \times 10^{-3}$, which is within the range specified by the present invention but the offset amount was set at 6 mm, which is outside the range specified by the present invention. In this case, the remaining bend evaluation of the tube subjected to the straightening became ○ but the amount of dimensional variation along a longitudinal direction of the inner surface of the tube became more than 4 m, so that the overall evaluation became x.

On the other hand, in Test Nos. 17 to 20 and 27 to 31, which are inventive examples of the present invention, the tube was subjected to the cold drawing by the high-pressure drawing using the lubricating oil of 40 MPa or more in pressure. The (2-2-2-2-2) type straightening machine having five pairs of straightening rolls and having a stand interval set at 300 mm or less was used. The tube was straightened with η set at $0.9 \times 10^{-3}$ or more and with the offset amount set at 5 mm or less. As a result, all of evaluations including the remaining bends of the tube subjected to the straightening, the amount of dimensional variation along a longitudinal direction of the inner surface of the tube, and the S/N ratio became good, so that the overall evaluation became ○.

From these tests, the following facts could be verified: when the tube subjected to the cold drawing by the high-pressure drawing using the lubricating oil of 40 MPa or more in pressure and to the solid solution heat treatment was straightened by the roll straightening machine having at least five pairs of straightening rolls and having a stand interval set at 300 mm or less with the value of r) set at $0.9 \times 10^{-3}$ or more and with the offset amount set at 5 mm or less, the bends of the tube could be straightened and the amount of dimensional variation along a longitudinal direction of the inner surface of the tube subjected to the straightening could be controlled to 4 μm or less and the tube having an excellent S/N ratio could be produced. Thus, it was made clear that according to the method for producing a heat transfer tube for a steam generator according to the present invention, a heat transfer tube for a steam generator according to the present invention, in which the amount of dimensional variation along a longitudinal direction of the inner surface of the tube is 4 μm or less, can be produced.

INDUSTRIAL APPLICABILITY

In a heat transfer tube for a steam generator according to the present invention, the amount of dimensional variation along a longitudinal direction of the inner surface of the tube is 4 μm or less, so that when the tube is produced, an inspection using an eddy current flaw detection can be conducted at a high S/N ratio and hence the inspection efficiency can be improved.

The method for producing a heat transfer tube for a steam generator according to the present invention has the following remarkable effects.

(1) The tube is subjected to cold drawing by use of the high-pressure lubricating oil of 40 MPa or more in pressure, so that an amount of dimensional variation along a longitudinal direction of the inner surface of the tube after the cold drawing and before straightening can be reduced.

(2) The tube is straightened by using the roll straightening machine in which at least five pairs of concave globoidal drum type straightening rolls are disposed and a stand interval is set at 300 mm or less, and by applying offsetting, which is formed by at least successive three pairs of straightening rolls of the roll straightening machine and has η set at $0.9 \times 10^{-3}$ or more and has the offset amount set at 5 mm or less, to the tube. This can reduce an increase of the amount of dimensional variation along a longitudinal direction of the inner surface of the tube attributable to the straightening.

(3) The method for producing a heat transfer tube for a steam generator according to the present invention, from the effects (1) and (2) described above, can produce the tube in which the amount of dimensional variation along a longitudinal direction of the inner surface of the tube is 4 μm or less and in which the amount of bend crookedness in a portion of a length of 1000 mm from a tube end is 1 mm or less.

Therefore, the heat transfer tube for a steam generator according to the present invention and the tube produced by the method for producing the same can secure an excellent quality accuracy and hence can guarantee quality at high reliability.

REFERENCE SIGNS LIST

1: tube to be straightened
R, Ra, and Rb: straightening roll

What is claimed is:

1. A method for producing a heat transfer tube for a steam generator, the method comprising:
    a step of providing a tube;
    a step of applying cold drawing to the tube, the step of applying cold drawing to the tube including using a high-pressure lubricating oil that has a pressure of 40 MPa or more;
    after the step of applying cold drawing to the tube, a step of applying a solid solution heat treatment to the tube; and
    after the step of applying a solid solution heat treatment to the tube, a step of straightening the tube by using a roll straightening machine,
    wherein
    the roll straightening machine includes at least five pairs of concave globoidal drum type rolls, each pair of rolls being arranged opposite to each other in a vertical direction and in a crossing manner such that directions of rotating shafts of each pair of rolls cross each other, a stand interval being set at 300 mm or less;
    in the step of straightening the tube, offsetting is formed by three points along a tube axial centerline that are crossing positions of at least three successive pairs of upper and lower straightening rolls of the roll straightening machine and offsetting makes η expressed by Formula (1) described below to satisfy $0.9 \times 10^{-3}$ or more and ensures an offset amount of 5 mm or less:

$$\eta = 1/R \times (d/2) \tag{1}$$

where given that an outside diameter of the tube is d (mm) and a stand interval of the roll straightening machine is L (mm) and an offset amount is δ (mm), $R=(\delta^2+L^2)/2\delta$ is established.

2. The method for producing a heat transfer tube for a steam generator according to claim 1, wherein a chemical composition of the tube consists of, in mass %, C: 0.15% or less, Si: 1.00% or less, Mn: 2.0% or less, P: 0.030% or less, S: 0.030% or less, Cr: 10.0 to 40.0%, Ni: 8.0 to 80.0%, Ti: 0.5% or less, Cu: 0.6% or less, Al: 0.5% or less, and N: 0.20% or less, the balance being Fe and impurities.

* * * * *